TELEVISION SYNCHRONIZING PULSE GENERATOR

Filed June 29, 1954 4 Sheets-Sheet 1

Inventor
GEORGE H. FATHAUER by Hill, Sherman, Meroni, Gross & Simpson
Attys.

March 29, 1960 G. H. FATHAUER 2,930,848

TELEVISION SYNCHRONIZING PULSE GENERATOR

Filed June 29, 1954 4 Sheets-Sheet 2

Inventor
George H. Fathauer by Hill, Sherman, Meroni, Gross & Simpson Attys.

TELEVISION SYNCHRONIZING PULSE GENERATOR

Filed June 29, 1954 4 Sheets-Sheet 3

Inventor
George H. Fathauer by Hill, Sherman, Meroni, Gross & Simpson
Attys.

Inventor
GEORGE H. FATHAUER
by Hill, Sherman, Meroni, Gross & Simpson Attys.

United States Patent Office 2,930,848

Patented Mar. 29, 1960

2,930,848

TELEVISION SYNCHRONIZING PULSE GENERATOR

George H. Fathauer, Decatur, Ill., assignor to Thompson Ramo Wooldridge, Inc., a corporation of Ohio Application June 29, 1954, Serial No. 440,215

18 Claims. (Cl. 178—69.5)

Figure 1:
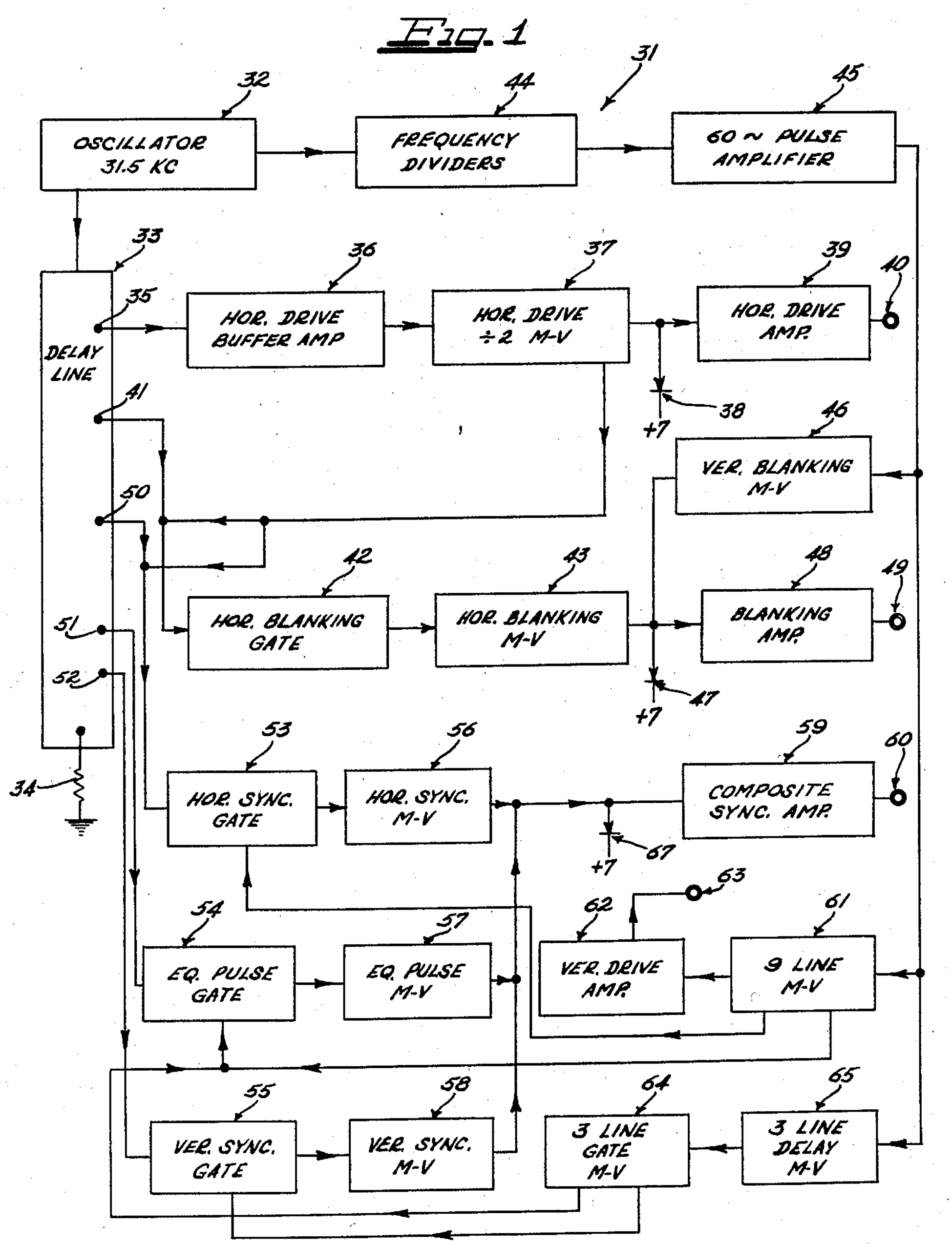

This invention relates to a television synchronizing pulse generator and more particularly to a synchronizing pulse generator for generating control signals for television cameras and blanking and synchronizing signals to be transmitted for synchronizing the receiver operation with that of the camera.

In order to obtain proper synchronization of the sweep circuits of television receivers with those of the cameras, it is the present practice to generate horizontal and vertical drive pulses for controlling the horizontal and vertical sweeps of the cameras, and horizontal and vertical synchronizing signals which are transmitted with the video signal to control the horizontal and vertical sweeps at the receiver. In addition, blanking signals may be transmitted with the video signal and horizontal and vertical synchronizing signals, to provide blanking of the receiver and to provide a base for the synchronizing signals.

The horizontal synchronizing signals may be pulses of relatively short duration relative to the time interval therebetween and the vertical synchronizing signals may comprise a train of pulses repeated at twice the repetition rate of the horizontal pulses with the duration of the vertical pulses being relatively great compared to the time interval therebetween. In the receiver, the horizontal and vertical synchronizing pulses are segregated by means of an integrator circuit responding to the vertical pulses and a differentiator circuit responding to the horizontal pulses.

In order to provide interlace, the repetition rate of the horizontal pulses may be equal to one-half of a rate equal to an odd multiple of the repetition rate of the trains of vertical pulses. With this arrangement, the time relation of the horizontal and vertical synchronizing signals may be such as to obtain proper interlace. However, since the time relation of one train of vertical pulses relative to the preceding horizontal pulses is different from the time relation of the next train of vertical pulses relative to the preceding horizontal pulses, the integrator circuit used to segregate the vertical signal from the horizontal signal may be in a different condition of charge at the start of one train of vertical pulses relative to its condition at the start of the preceding or following train of vertical pulses, to affect the time of start of the vertical sweeps and to affect adversely the proper interlace.

To obviate this effect, a series of equalizing pulses may precede each train of vertical pulses, the equalizing pulses having a repetition rate equal to twice the repetition rate of the horizontal pulses, for maintaining continued operation of the horizontal sweep generator at the receiver during the transmission of the vertical synchronizing signal.

With such equalizing pulses, the condition of charge of the integrator circuit may be substantially the same for each train of vertical synchronizing pulses. It is usual practice to transmit a series of equalizing pulses after as well as before each train of vertical pulses.

It will be appreciated that the horizontal and vertical synchronizing pulses, the equalizing pulses and the blanking signal should have very sharp leading and trailing edges and very precise durations and should be very accurately related in time and magnitude to properly control the receiver, and the Federal Communications Commission has prescribed quite stringent requirements for the transmission of these synchronizing signals.

In addition to generation of the synchronizing signals, the horizontal and vertical drive pulses must be generated for application to the cameras and such drive pulses must be very accurately related in time to the synchronizing signals. A special problem is presented because the television camera may oftentimes be located at a considerable distance from the synchronizing generator and there may be a time lag between the transmission of the drive pulses to the camera and the reception of the corresponding video signal from the camera. It is necessary in the synchronizing generator to compensate for such time lags.

Under present F.C.C. regulations, the repetition rate of the trains of vertical pulses is 60 per second, the repetition rate of the horizontal pulses is 15,750 per second and the repetition rate of the equalizing pulses is 31,500 per second. It will be noted that the repetition rate of the equalizing pulses is twice that of the horizontal pulses and is equal to an odd multiple (525) of the vertical repetition rate. As indicated above, this provides the proper interlace.

To generate the required synchronizing signals, it has heretofore been the practice to employ a very large number of tubes and other circuit components in an apparent attempt to isolate the various pulse generating circuits from one another and prevent interaction therebetween and in an apparent attempt to obtain stability of the various pulse generating circuits. While it has been possible with such systems to produce driving and synchronizing signals of the required accuracy, such systems have been very expensive, very difficult and complex to adjust and because of the large number of tubes and other components employed, they are subject to breakdown or faulty operation in the absence of very meticulous maintenance.

This invention was evolved with the object of providing a synchronizing generator which will generate the required driving and synchronizing signals and yet utilize a minimum number of tubes and component parts.

By this invention, a synchronizing generator is provided which utilizes a minimum number of tubes and other components. It has been found that with this generator, a very high degree of accuracy is achieved, even greater in many respects than that achieved with the complex systems heretofore employed and by virtue of having fewer parts, the generator is very reliable in operation. In addition, the circuits are comparatively simple and straightforward and are readily adjusted so that the generator is readily maintained. A further advantage is in the fact that the generator is very compact and can be readily transported so as to be especially desirable for use with portable equipment.

Figure 2A:
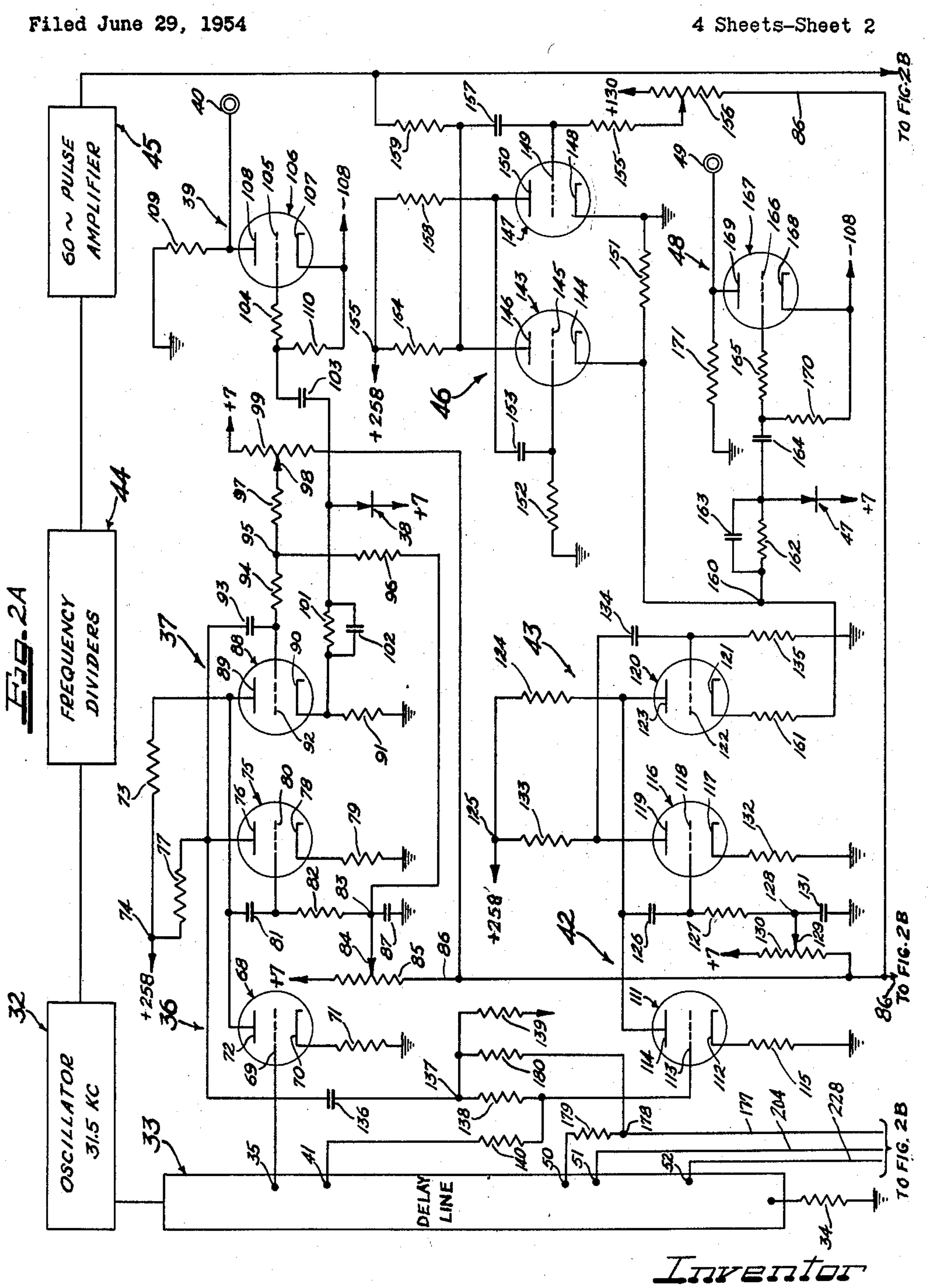
Figure 2B:
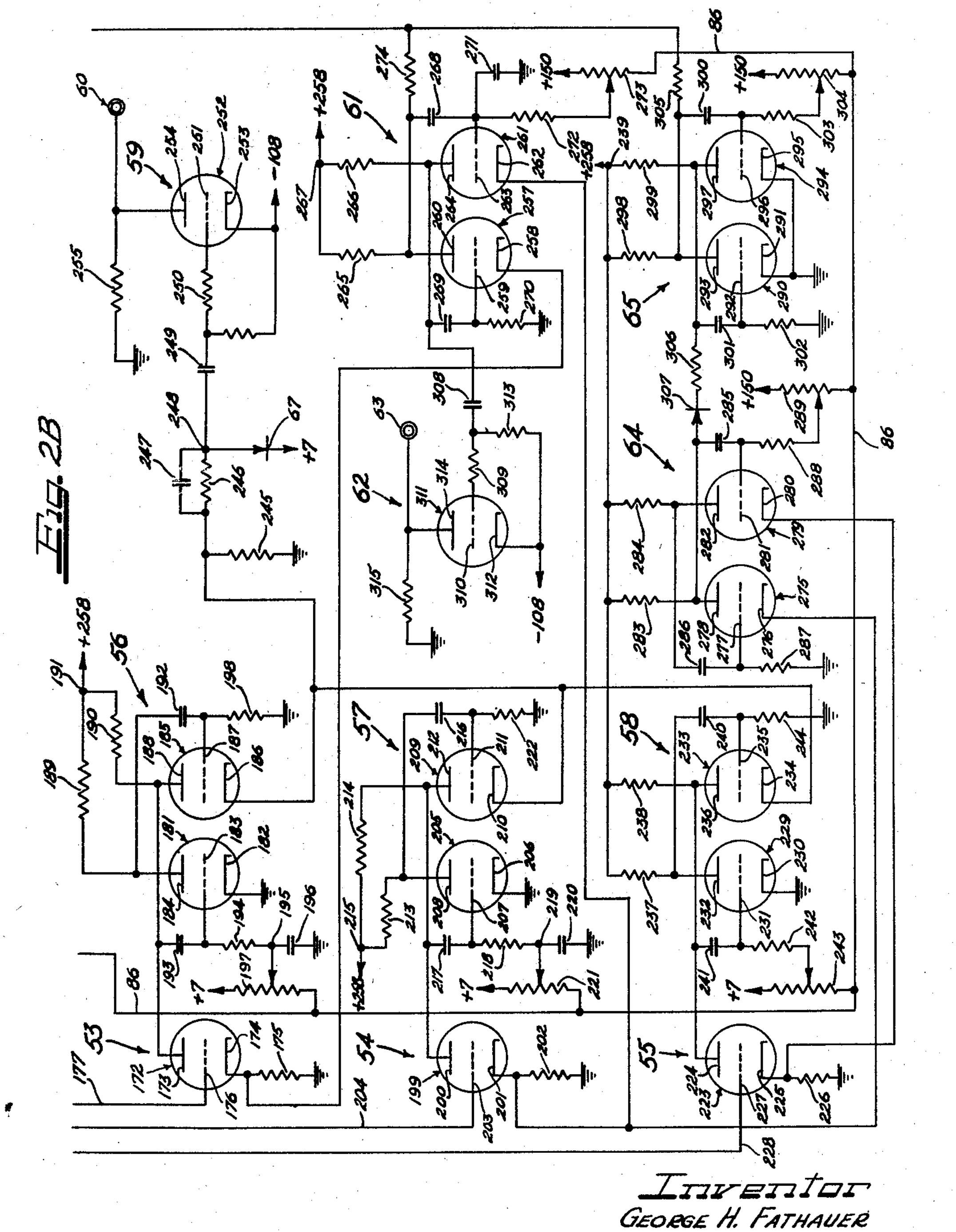
Figure 3:
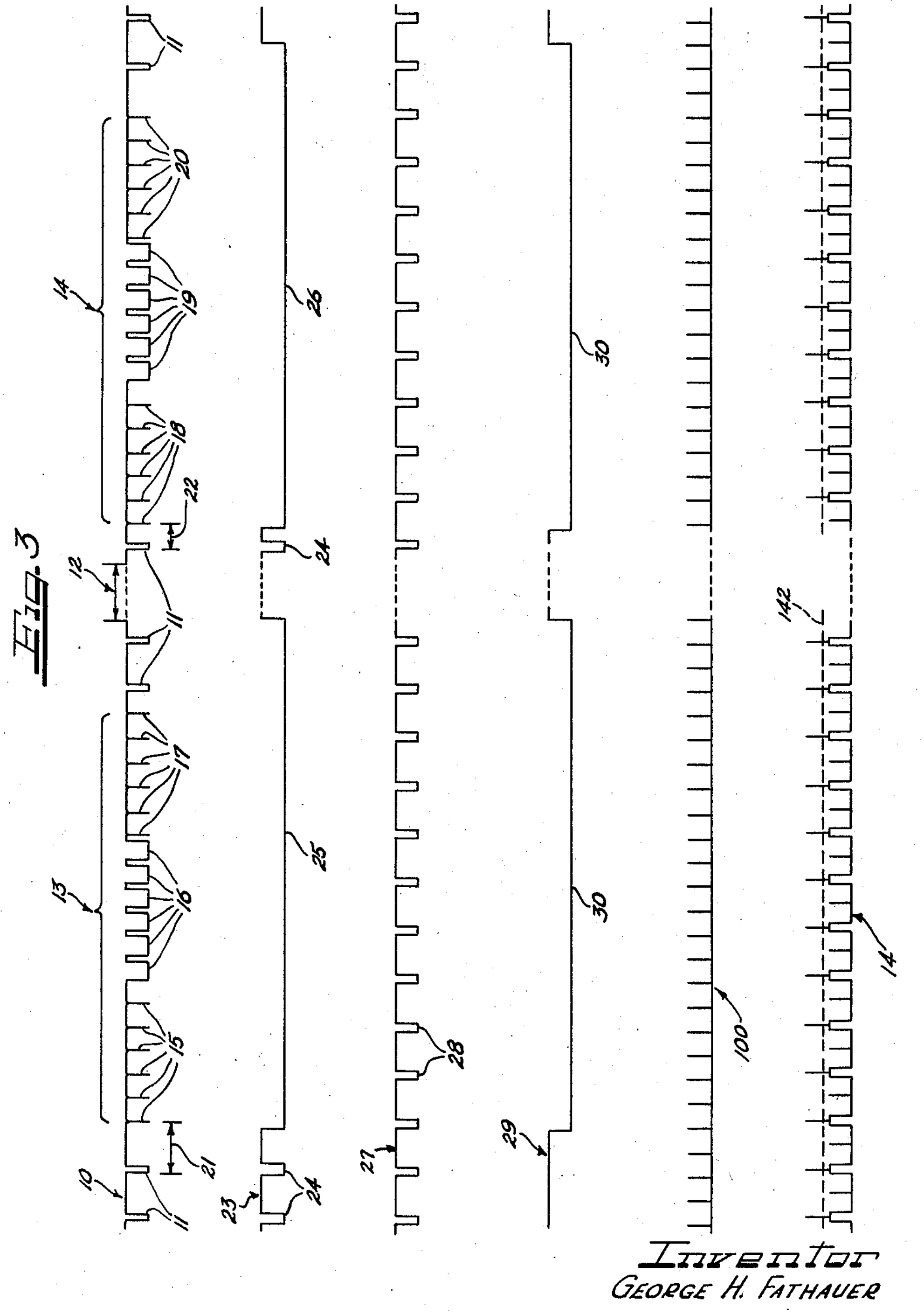

Other objects, features and advantages of the present invention will become more fully apparent from the following detailed description taken in conjunction with the accompanying drawings which illustrate a preferred embodiment and in which:

Figure 1 is a schematic block diagram of a television synchronizing generator constructed in accordance with the principles of this invention;

Figures 2A and 2B together form a circuit diagram of the generator illustrated in block form in Figure 1 and with only certain conventional circuits being shown in block form; and Figure 3 graphically illustrates wave forms of signals produced by the generator and the signals at certain points in the circuit of the generator.

It is believed that the invention will be most readily understood by first considering the signal that it is desired that the generator should produce. Referring to Figure 3, reference numeral 10 designates a composite synchronizing signal which is transmitted to a receiver to control the horizontal and vertical sweeps of the cathode ray beam in the receiver picture tube. This composite synchronizing signal comprises negative horizontal synchronizing pulses 11 which are repeated at a certain repetition rate. Under present F.C.C. regulations, the repetition rate for the horizontal pulses is 15,750 per second. Actually, only a few of the horizontal synchronizing pulses 11 are illustrated in the wave form in Figure 3 for the reason that it was desired to clearly illustrate two successive vertical synchonizing signals. In the time interval designated by reference numeral 12, there may be a great many horizontal pulses, for example, 251.

Vertical synchronizing signals are periodically generated to control the vertical sweep in the television receiver. Reference numeral 13 generally designates one such vertical synchronizing signal and reference numeral 14 designates a succeeding vertical synchronizing signal. These signals are identical in form but have different time relations to the horizontal pulses, in order to obtain proper interlace.

The vertical synchronizing signal 13 may comprise a series of equalizing pulses 15 which are followed by a train of vertical synchronizing pulses 16, the synchronizing pulses 16 being followed by a second series of equalizing pulses 17. The succeeding vertical synchronizing signal 14 may similarly comprises a first set of equalizing pulses 18, vertical synchronizing pulses 19 and a second set of equalizing pulses 20.

The purpose of this arrangement of the pulses is to enable proper segregation of the horizontal synchonizing signal from the vertical synchronizing signal at the receiver. It will be noted that the horizontal pulses 11 have a relatively short duration with respect to the time interval therebetween while the vertical synchronizing pulses 16 and 19 have a relatively long duration in respect to the time interval therebetween. At the receiver, an integrating circuit is provided for controlling the vertical sweep. Such a circuit will develop a comparatively large output in response to the relatively long vertical synchronizing pulses 16 and 19 as compared to the output developed from the relatively short horizontal pulses 11. Thus the integrating circuit may respond only to the vertical synchronizing pulses 16 and 19. The receiver may have a differentiating circuit to respond to the sharp leading edges of the horizontal pulses 11 to control the horizontal sweep.

To provide proper interlace, the repetition rate of the horizontal pulses 11 may be equal to an odd multiple of the repetition rate of the vertical synchronizing signal divided by an even number. For example, the horizontal repetition rate, as previously indicated, may be 15,750 per second and the vertical repetition rate may be 60 per second, 15,750 being equal to 60 multiplied by an odd number (525) and divided by an even number (2). With this arrangement the time interval between the start of one vertical synchronizing signal and the immediately preceding horizontal pulse may differ from the time interval between the start of the next succeeding vertical synchronizing signal and the horizontal pulse immediately preceding such a signal by a quantity equal to one-half of the period of the horizontal pulse. For example, the time interval designated by reference numeral 21 between the start of the vertical synchronizing signal 13 and the retaining horizontal pulse may be equal to the period of the horizontal pulses while the time interval designated by reference numeral 22 between the succeeding vertical synchronizing signal 14 and the immediately preceding horizontal pulse 11 may be equal to one-half of the period of the horizontal pulses.

Because of this differing time relation of successive vertical signals relative to the horizontal pulses, the integrating circuit at the receiver used to segregate the vertical synchronizing signals from the horizontal synchronizing signals might be in a different state of charge at the beginning of one vertical synchronizing signal from the state of charge at the beginning of the preceding or succeeding synchronizing signal, if the vertical synchronizing pulses 16 or 19 immediately followed a horizontal pulse 11. This would, of course, introduce inaccuracies in the interlace at the receiver. To obviate such a difficulty, the equalizing pulses 15 are transmitted before the transmission of the vertical synchronizing pulses 16 and similarly, the equalizing pulses 18 are transmitted before the vertical synchronizing pulses 19. These equalizing pulses have very short time duration and very little effect on an integrating circuit and hence the integrating circuit at the receiver will have substantially the same charge at the start of the train of vertical synchronizing pulses 16 as it will have at the start of the vertical synchronizing pulses 19 of the next succeeding signal. By present F.C.C. regulations, the series of equalizing pulses 17 and 20 are transmitted after the respective synchronizing pulses 16 and 19.

It may be noted that the purpose of utilizing a series of pulses 16 or 19 instead of a single long pulse and the purpose of using a series of the equalizing pulses 15, 17, 18 or 20 instead of no transmission at all is to insure continued operation of the horizontal sweep circuit at the receiver during the transmission of the vertical synchronizing signals. It will be noted that during the vertical synchronizing signals, a sharply negative wave front is presented at a rate twice the repetition rate of the horizontal pulses. Such wave fronts will generate signals in the differentiating circuit of the horizontal sweep circuit at the receiver, and alternate ones of such signals will control the horizontal sweep.

Under F.C.C. regulations, six of the equalizing pulses 15 or 18 are generated, followed by six of the vertical synchronizing pulses 16 or 18, followed by six of the equalizing pulses 17 or 20. Thus the duration of the equalizing pulses 15 or 18 is equal to three times the period of the horizontal pulses 11 and the synchronizing pulses 16 and 19 and equalizing pulses 17 and 20 have similar durations. In the art, the time period of the horizontal pulses is referred to as one horizontal line, or simply as one line, since one line is formed at the picture tube of the receiver for each of the horizontal pulses. Accordingly, the equalizing pulses 15 or 18 may be said to have a duration of 3 lines, the synchronizing pulses 16 or 19 may be said to have a duration of 3 lines, and the equalizing pulses 17 and 20 may likewise be said to have a duration of 3 lines. The total duration of each of the vertical synchronizing signals 13 and 14 is 9 lines.

In addition to the composite synchronizing signal 10, the synchronizing generator must also generate a blanking signal generally designated by reference numeral 23. This blanking signal 23 is transmitted along with the composite synchronizing signal 10 to blank out the video signal during transmission of the synchronizing pulses and to provide a reference level. This blanking signal 23 may comprise pulses 24 corresponding to the horizontal synchronizing pulses 11 and pulses 25 and 26 corresponding to the vertical synchronizing signals 13 and 14. The pulses 24 should start in advance of the horizontal synchronizing pulses 11 and end after the end of the horizontal synchronizing pulses 11 and the pulses 25 and 26 should similarly start before and end after the start and end of the vertical synchronizing signals 13 and 14.

The synchronizing generators should also generate horizontal and vertical drive pulses for controlling the horizontal and vertical sweeps at the television cameras. The horizontal drive signal is designated by reference numeral 27 and comprises pulses 28 corresponding to the horizontal synchronizing pulse 11. The vertical drive signal is designated by reference numeral 29 and comprises pulses 30 corresponding to the vertical synchronizing signals. The cameras may oftentimes be located at a considerable distance from the synchronizing generator and transmitter and an appreciable time period may elapse between the sending out of the drive pulses at the generator and the reception of the video signal from the camera. For this reason, the start of the horizontal drive pulses 28 and the vertical drive pulses 30 should precede the start of the synchronizing signals, to compensate for this time delay.

It will be appreciated that in order to achieve proper operation and synchronization of the television receivers with the cameras, the signals thus far described must be very accurately produced. It is the object of this invention to produce such signals with a very high degree of accuracy and with a minimum number of tubes and other component parts in an apparatus that is very reliable in operation, easily adjusted, compact and portable.

Referring now to Figure 1, reference numeral 31 generally designates a synchronizing generator constructed according to the principles of this invention. The generator 31 may comprise means for generating pulses at a rate equal to twice the repetition rate of the horizontal synchronizing or drive pulses, which means may comprise a suitable oscillator 32 operating at a frequency of 31.5 kilocycles, equal to twice the horizontal repetition rate of 15,750 per second prescribed by the F.C.C.

Pulses from the oscillator 32 are utilized to control generation of the various pulses described above in connection with Figure 3 and, as pointed out above, it is necessary that the start of certain of the pulses be delayed with respect to other pulses. To achieve the required time delays, pulses from the oscillator 32 are coupled to a delay line 33 which, as is well known to the prior art, may comprise lumped inductances and capacitances forming the equivalent of a transmission line of considerable length, the terminal end of the delay line 33 being connected to a resistor 34 having a resistance equal to the characteristic impedance of the delay line so that reflections along the delay line are prevented. The delay line 33 may have a multiplicity of taps therealong to which connections may be made to obtain pulses in the proper time relation for control of generation of the various signals.

Under normal circumstances, the start of the horizontal drive pulse, which controls the horizontal sweep of the camera, must precede the start of the various other signals. The generation of such horizontal drive pulses, which have a repetition rate of 15,750 per second, may be controlled directly from pulses 31.5 kc. from a tap 35 on the delay line 33 close to the input end thereof. It may be noted, at this point, that in systems of the prior art, two delay lines are used, one operated at 31.5 kc. and the other operated at 15,750 c.p.s. and, with the generator 31 of this invention, only a single delay line 33 is used, thus eliminating one delay line, as well as certain circuits heretofore required in connection with providing two delay lines.

For generation of the horizontal drive pulses, the tap 35 is coupled to a horizontal drive buffer amplifier 36 which drives a horizontal drive multi-vibrator 37 which is controlled by alternate pulses at the 31.5 kc. rate to generate pulses at a repetition rate of 15,750 per second.

The pulses from the horizontal drive multi-vibrator may be of positive polarity and may be applied to a clipping rectifier 38 operated at a predetermined bias level, for example, plus 7 volts, so that the positive pulses will have a uniform amplitude. The clipped pulses are applied to a horizontal drive amplifier 39 which inverts the pulses, the pulses of negative polarity being applied to an output jack 40. The jack 40 may, of course, be coupled to the television camera or cameras.

Under usual circumstances, the start of the horizontal blanking pulses, designated by reference numeral 29 in Figure 3, is delayed from the start of the horizontal drive pulses but, as indicated above, the start of the horizontal blanking pulses is in advance of the start of the horizontal sync pulses. For generation of the horizontal blanking pulses, a tap 41 on the delay line 33 spaced further from the input end thereof than the tap 35 is coupled to a horizontal blanking gate circuit 42 which, in turn, is coupled to a horizontal blanking multi-vibrator 43.

The repetition rate of the horizontal blanking pulses is, of course, the same as the reption rate of the horizontal drive and sync pulses, or 15,750 per second in the instant case. The horizontal blanking multi-vibrator 43 might be so adjusted as to be operated only by alternate pulses at the 31.5 kc. rate directly from the tap 41. However, it may be difficult to achieve such operation with stability and further, the blanking pulses must coincide with the horizontal drive pulses and it could happen that the same pulses that operate the horizontal drive multi-vibrator would not operate the horizontal blanking multi-vibrator.

According to an important feature of the present invention, a gating signal derived from the horizontal drive multi-vibrator is applied to the horizontal blanking gate circuit 42 to insure triggering of the horizontal blanking multi-vibrator by the proper pulses and to achieve maximum stability of operation of the horizontal blanking multi-vibrator. It will be noted that a coupling from the horizontal drive multi-vibrator 37 to the horizontal blanking gate circuit 42 is indicated diagrammatically in Figure 1, and this coupling will be described in detail in connection with the circuit diagram of Figures 2A and 2B.

As previously described in connection with Figure 3, the blanking signal 23 is a composite signal including the horizontal pulses 24 and the vertical pulses 25 and 26.

To obtain the vertical blanking pulses, as well as to obtain the vertical drive pulses and pulses for control of the generation of the vertical synchronizing signal, the oscillator 32 may be coupled to a frequency divider circuit 44 which may take any of the forms well known in the art and which may generate pulses at a rate that is a predetermined fraction of the frequency of the oscillator 32. In the instant case, the frequency divider circuit 44 may generate pulses at a rate of 60 per second. Such pulses may be applied to a 60 cycle pulse amplifier 45 which applies amplified pulses to a plurality of circuits including a vertical blanking multi-vibrator 46. The output of the vertical blanking multi-vibrator 46 may be in the form of positive pulses at the 60 cycle per second repetition rate, which may have an adjustable duration, preferably somewhat longer than the duration of the vertical synchronizing signals 13 and 14. The output of the vertical blanking multi-vibrator thus corresponds to the pulses 25 and 26 shown in Figure 3 but is of positive rather than negative polarity.

The output of the vertical blanking multi-vibrator 46 is combined with the output of the horizontal blanking multi-vibrator 43, which is also of positive polarity, and the combined outputs are applied to a clamping rectifier 47 which may be biased at a positive potential, for example, 7 volts, to limit the magnitude of the pulses to such magnitude. The combined and clipped pulses are applied to a blanking amplifier 48 which inverts the polarity of the pulses and applies pulses of negative polarity to a jack 49. The wave form at the output jack 49 is indicated by the reference numeral 23 in Figure 3.

To generate a composite synchronizing signal such as designated by reference numeral 10 in Figure 3, taps 50, 51 and 52 on the delay line 33 are respectively connected to a horizontal synchronizing gate circuit 53, an equalizing pulse gate circuit 54 and a vertical synchronizing pulse gate circuit 55 which circuits are respectively connected to a horizontal synchronizing pulse multi-vibrator 56, an equalizing pulse multi-vibrator 57 and a vertical synchronizing pulse multi-vibrator 58. The horizontal synchronizing pulse multi-vibrator generates pulses such as the pulses 11 illustrated in Figure 3, the equalizing pulse multi-vibrator 57 generates pulses such as the pulses 15, 17, 18 and 20 in Figure 3 and the vertical synchronizing pulse multi-vibrator 58 generates pulses such as the pulses 16 and 19 in Figure 3.

According to a particular feature of the invention, the multi-vibrators 56, 57 and 58 are so controlled through the gate circuits 53, 54 and 55 as to be operative in a sequence such that the wave form 10 of Figure 3 is produced, and the output of the multi-vibrators 56, 57 and 58 are directly combined and applied to a composite synchronizing pulse amplifier 59 which has an output connected to a suitable jack 60. The output of the multi-vibrators 56, 57 and 58 may be of positive polarity and the composite synchronizing amplifier 59 may invert the polarities of the pulses, so that the signals at the jack 60 may have a form like the composite synchronizing signal 10 of Figure 3.

It may be noted, at this point, that the direct combination of the outputs of the multi-vibrators to produce the composite synchronizing signal is of particular advantage because it eliminates the necessity for buffer amplifiers and certain modulator arrangements heretofore employed.

For controlling the gate circuits 53, 54 and 55 so as to cause generation of the horizontal synchronizing, equalizing and vertical synchronizing pulses in the proper sequence, the output of the 60 cycle pulse amplifier 45 is connected to what may be termed a 9 line multi-vibrator 61. This multi-vibrator 61 may have a plurality of outputs. One of the outputs may produce positive pulses at the rate of 60 per second, each pulse having a duration equal to 9 times the period of the horizontal synchronizing pulses, or 9 lines. This output may be applied to a vertical drive amplifier 62, which inverts the pulses, the output of the vertical drive amplifier 62 being applied to a jack 63. The output at the jack 63 may thus have a wave form like the wave form 29 in Figure 3, except that the pulses 30 will have a duration equal to 9 times the period of the horizontal synchronizing pulses 11, or 9 lines. It may be noted that it is permissible for the duration of the vertical drive pulses to vary between comparatively wide limits and is not critical. The 9 line duration has been chosen because the 9 line duration is approximately midway between the permissible limits and because there is no necessity for adjustability of this duration, so that the input to the vertical drive amplifier 62 may be taken directly from the 9 line multi-vibrator which also controls other circuits, and the necessity for a separate adjustable multi-vibrator is obviated.

The 9 line multi-vibrator 61 has another output which may comprise positive pulses of 9 line duration at a 60 cycle rate. This output is applied to the horizontal synchronizing pulse gate circuit 53 in a manner such that the gate circuit is normally operative to transmit the triggering pulses from the tap 50 to the horizontal synchronizing multi-vibrator 56, but is ineffective to transmit such pulses during the existence of the positive pulses. The horizontal synchronizing pulses, such as the pulses 11 in Figure 3 may thus be produced only at the proper times.

The 9 line multi-vibrator 61 may have a third output comprising negative pulses at a 60 cycle rate and of 9 line duration. This output may be applied to the equalizing pulse gate circuit 54 in conjunction with an output from a 3 line gate multi-vibrator 64 which is controlled by a 3 line delay multi-vibrator 65 which, in turn, is controlled by pulses from the 60 cycle pulse amplifier 45.

The 3 line delay multi-vibrator 65 generates pulses at the 60 cycle rate having a duration of 3 times the period of the horizontal synchronizing pulses or 3 horizontal lines. At the end of each of such 3 line pulses, the 3 line gate multi-vibrator 64 is triggered to generate a positive pulse at the output thereof connected to the equalizing pulse gate 54, which pulse has the duration of 3 lines.

The combined outputs of the 9 line multi-vibrator 61 and the 3 line gate multi-vibrator 64 at the equalizing pulse gate will cause the gate to couple pulses from the tap 51 on the delay line 33 to the equalizing pulse of multi-vibrator 57 for a period of 3 lines, followed by a period of 3 lines in which no pulses are coupled, followed by another period of 3 lines in which the pulses are again coupled. The result is that the equalizing pulse multi-vibrator will generate 6 equalizing pulses such as the pulses 15 in Figure 3, followed by a period of 3 lines in which no equalizing pulses are generated, followed by another 6 equalizing pulses such as the pulses 17.

The vertical synchronizing pulse gate circuit 55 is also controlled from the 3 line gate multi-vibrator 64. For this purpose, the 3 line gate multi-vibrator 64 has an output in the form of a negative pulse of 3 line duration which starts 3 lines after the application of a pulse from the 60 cycle pulse amplifier 45 to the 3 line delay multi-vibrator 65. This negative pulse causes the vertical synchronizing gate circuit 55 to couple pulses from the tap 52 on the delay line 33 to the vertical synchronizing pulse multi-vibrator 58 which will generate 6 synchronizing pulses, such as the pulses 16 or 19 in Figure 3 when the negative pulse is applied from the 3 line gate multi-vibrator to the vertical synchronizing pulse gate circuit 55.

It will thus be appreciated that by combining the outputs of the horizontal synchronizing pulse multi-vibrator 56, the equalizing pulse multi-vibrator 57 and the vertical synchronizing pulse multi-vibrator 58, a composite synchronizing signal may be produced. The pulses from such circuits may not have flat topped wave forms and further, without very precise adjustments, they may not have the same magnitude.

The combined outputs of multi-vibrators 56, 57 and 58 are therefore preferably applied to a clamping rectifier 67 which may be biased at a positive potential, for example, 7 volts, the potential of the pulse outputs of the multi-vibrators 56, 57 and 58 being positive, as previously indicated.

It should be noted that it is a feature of the present invention that the horizontal synchronizing pulse multi-vibrator 56, which generates pulses at a repetition rate of 15,750 per second, is controlled directly by pulses at the 31.5 kc. rate from the delay line 33, so that a separate 15,750 cycle delay line is not required. The multi-vibrator 56 may be so adjusted as to be operated only by alternate pulses from the delay line 33 but to insure stability in the generation of such pulses, and to insure that the pulses that operate the horizontal drive multi-vibrator 37 also operate the horizontal synchronizing pulse multi-vibrator 56, an output from the horizontal drive multi-vibrator 37 may be coupled together with the pulse output at the tap 50 of the delay line 33 to the input of the horizontal synchronizing pulse gate circuit 53. This coupling circuit is indicated diagrammatically in Figure 1 and, like the coupling of the horizontal drive multi-vibrator 37 to the horizontal blanking gate circuit 42, it will be described in detail hereinafter.

Having thus described the general arrangement and operation of the synchronizing generator 31, reference is now made to Figures 2A and 2B which illustrate the arrangement of the various circuits in detail, except that the circuit of the oscillator 32, the delay line 33, the frequency dividers 44 and the 60 cycle pulse amplifier 45 are not shown in detail and are shown only in block form, for the reason that such circuits are known in the prior art and, by themselves, form no part of the present invention. Preferred circuits for the oscillator 32, the delay line 33, the frequency dividers 44 and the 60 cycle pulse amplifier 45 are disclosed in a magazine article entitled "Portable Sync Generator for T.V. Broadcasting" by Harold E. Ennes in the April 1954, issue of Electronics Magazine, at pages 138–141. This article also discloses illustrative values for the various components of the generator of this arrangement, as well as a power supply for obtaining the requisite D.C. voltages from an A.C. power line.

As shown in Figure 2A, the horizontal drive buffer amplifier 36 may comprise a triode space discharge device 68 having a grid 69 connected to the tap 35 on the delay line 33, a cathode 70 connected through a cathode resistor 71 to ground and a plate 72 connected through a resistor 73 to a circuit point 74 which may be at a relatively high positive potential with respect to ground, for example, 258 volts.

The multi-vibrator 37 may comprise a first triode 75 having a plate 76 connected through a resistor 77 to the circuit point 74, a cathode 78 connected through a resistor 79 to ground and a control grid 80 connected through a capacitor 81 to the plate 72 of the triode 58 and also through a resistor 82 to a bias point 83. This point 83 may be connected to the movable contact 84 of a potentiometer 85 having one terminal connected to a point at a predetermined potential relative to ground, for example plus 7 volts, with its other terminal being connected to a bias inter-connect line 86. The line 86 may inter-connect the bias circuit of the triode 75 with the bias circuits in various other stages of the generator to equalize the same. This line 86 may normally be at a positive potential substantially greater than the potential of the other end of the potentiometer 85, for example plus 65 volts. It will be understood that by adjustment of the movable contact 84, the bias level of the triode 75 may be adjusted. To prevent fluctuations in the potential of the circuit point 83, it may be connected through a capacitor 87 to ground.

The multi-vibrator 37 may also comprise a second triode 88 having a plate 89 connected directly to the plate 72 of the triode 68 so as to be connected through the resistor 73 to the circuit point 74, a cathode 90 connected through a resistor 91 to ground and a grid 92 connected to a capacitor 93 to the plate 76 of the triode 75 and also through a resistor 94 to a circuit point 95. The circuit point 95 is connected through a resistor 96 to the bias of point 83 and also through a resistor 97 to a movable contact 98 of a potentiometer 99 having one terminal connected to a point at a predetermined potential relative to ground, for example plus 7 volts, with its other terminal connected to the bias inter-connect line 86. It will be noted that the potential of the circuit point 95 is determined by the adjustment of the potentiometer 85 and the adjustment of the potentiometer 99. Thus the potentiometer 85 may be adjusted to adjust the bias potential of both of the triodes 75 and 88 while the adjustment of the potentiometer 99 will affect only the bias of the triode 88.

To illustrate the operation of this circuit of the horizontal drive multi-vibrator 37, it may be assumed that the triode 75 is conducting with the triode 88 not conducting, with the capacitor 81 gradually charging through the resistors 73 and 82 to lower the potential of the grid 80 and with the capacitor 93 gradually discharging to raise the potential of the grid 92 of the triode 88.

The wave form at the tap 35 of the delay line 33 may be designated by reference numeral 100 including short positive pulses at the 31.5 kc. rate. Such pulses are applied to the grid 69 to cause the momentary increase in the current through the triode 68 and a momentary increase in current through the resistor 73 to thus cause a decrease in the potential of the plates 72 and 89. This will cause the potential of the grid 80 of the triode 75 to be lowered to thus lower the current through the resistor 77 and thus increase the potential of the plate 76 of the triode 75. This increased potential of the plate 76 will also cause an increase in the potential of the grid 92 of the triode 88. If the increased potential of the grid 92 is sufficient, the triode 88 may be caused to conduct which will lower the potential of the plate 89 of the triode 88, lower the potential of the grid 80 of the triode 75, to drive the tube 75 into a non-conducting state. The capacitor 93 may then charge up to gradually decrease the potential of the grid 92 while the capacitor 81 may gradually discharge to raise the potential of the grid 80 of the triode 75. Lowering the potential of the grid 92 of the triode 88 will decrease the current flow therethrough to increase the potential of the plate 89 and tend to increase the potential of the grid 80 and, of course, the discharging of the capacitor 81 will also tend to raise the potential of the grid 80. After a predetermined time dependent upon the time constant of the circuits and the relaaive operating points, the potential of the grid 80 of the tube 75 will be sufficient to cause the tube 75 to conduct, which will cause the potential of the plate 76 to be lowered, to cause the potential of the grid 92 of the triode 88 to be lowered, to cause non-conduction of the triode 88. The cycle may then be repeated.

By adjustment of the potentiometers 85 and 99 the circuit may be triggered by alternate pulses on the grid 69 and the triode 88 may conduct for a time equal to the desired duration of the horizontal drive pulses.

The output of the horizontal drive multi-vibrator 37 which as previously indicated should be in the form of positive voltage pulses, may be taken from the cathode 90 of the triode 88, which cathode may be connected through a resistor 101 and capacitor 102 in parallel to the clamping rectifier 38 and also through a capacitor 103 and a resistor 104 in series to a grid 105 of a triode 106 of the horizontal drive pulse amplifier 39. The triode 106 may have a cathode 107 and a plate 108. The plate 108 is connected to the jack 40 and to obtain negative pulses at the jack 40 with respect to ground without necessitating special coupling arrangements, the cathode 107 may be connected to a point of relatively high negative potential relative to ground, for example, minus 108 volts, and the plate 108 may be connected to a resistor 109 to ground. A return from the grid 105 to the cathode 108 may be provided by a resistor 110 connected between the cathode 107 and the junction between the capacitor 103 and the resistor 104.

The circuits of the horizontal blanking gate 42 and the horizontal blanking multi-vibrator 43 may be very similar to the circuits of the horizontal drive buffer amplifier 36 and the horizontal drive multi-vibrator 37, respectively. In particular, the horizontal blanking gate 42 may comprise a triode 111 having a cathode 112, a grid 113 and a plate or anode 114 with the cathode 112 being connected through a cathode resistor 115 to ground.

The horizontal blanking multi-vibrator may comprise a first triode 116 having a cathode 117, a grid 118 and a plate 119 and a second triode 120 having a cathode 121, a grid 122 and a plate 123. The plates 114 and 123 of the triodes 111 and 120 are connected together and through a resistor 24 to a point 125 of relatively high positive potential, for example, 258 volts, relative to ground, and the plates 114 and 123 are also connected through a capacitor 126 to the grid 118 which is connected through a resistor 127 to a bias point 128 which is connected to the movable contact 129 of a potentiometer 130 having one terminal connected, for example, to a point at plus 7 volts with its other terminal connected to the bias inter-connect line 86. The bias point 128 is also connected through a capacitor 131 to ground. The cathode 117 of the triode 116 is connected through a cathode resistor 132 to ground while the plate 119 is connected through a resistor 133 to the circuit point 125, the plate 119 being also connected through a coupling capacitor 134 to the grid 122, the grid 122 being connected through a resistor 135 to ground.

This circuit of the multi-vibrator 43 may operate in the same general fashion as the multi-vibrator 37. However, as previously indicated, means are provided for coupling the horizontal blanking gate circuit 42 to the horizontal drive multi-vibrator 37 in a manner such as to insure stability of operation of the blanking multi-vibrator 43 and to insure that the blanking pulses generated by the blanking multi-vibrator 43 will correspond with the drive pulses generated by the horizontal drive multi-vibrator 37. To provide such coupling, pulses from the horizontal drive multi-vibrator 37 of the same polarity as pulses at the tap 41 of the delay line 33, in this case positive, are combined and applied to the grid 113 of the blanking gate triode 111 with the bias level of the triode being such that conduction of the triode 111 is caused only when a pulse from the horizontal drive multi-vibrator 37 coincides with a pulse from the tap 41. Since the pulses at the tap 41 are delayed somewhat from the pulses at the tap 35 that control the horizontal drive multi-vibrator 37, there will be a pulse from the tap 41 coinciding with each of the pulses from the multi-vibrator 37, but only alternate pulses from the tap 41 will so coincide and hence be effective to trigger the horizontal blanking circuit.

More in particular, the coupling circuit may comprise a connection from the plate 76 of the triode 75, the plate 76 having a positive pulse output with the peak of such pulse being at a substantially uniform level relative to ground, that is, the potential at the circuit point 74. A capacitor 136 is connected between the plate 76 and the circuit point 137 which is connected through a resistor 138 to the grid 113 of the triode 111, the circuit point 137 being also connected through a resistor 139 to a point of negative potential relative to ground, for example minus 108 volts. The tap 41 of the delay line 33 is also connected through a resistor 140 to the grid 113 of the triode 111.

The resultant wave form at the grid 113 of the triode 111 may be as designated by reference numeral 141 in Figure 3 and the bias level may be as indicated by the dotted line 142 in Figure 3 so that only alternate pulses will trigger the multi-vibrator 43 and so that the pulses that do trigger the multi-vibrator 43 will coincide with drive pulses from the multi-vibrator 37.

As previously indicated, the output of the horizontal blanking multi-vibrator 43 may be combined with the output of the vertical blanking multi-vibrator 46. The vertical blanking multi-vibrator 46 may comprise a first triode 143 having a cathode 144, a grid 145 and a plate 146 and a second triode 147 having a cathode 148, a grid 149 and a plate 150. The cathode 144 may be connected through a resistor 151 to ground, the grid 145 may be connected through a resistor 152 to ground and also through a capacitor 153 to the plate 150 of the triode 147, and the plate 146 may be connected through a resistor 154 to a circuit point 155 at a relatively high positive potential, for example, 258 volts, relative to ground. The cathode 148 of the triode 147 may be connected directly to ground, the grid 149 may be connected through a resistor 155 to the movable contact of a potentiometer 156 having one terminal connected to the bias interconnect line 86 with its other terminal connected to a point at a predetermined potential relative to ground, for example plus 150 volts, the grid 149 being also connected through a capacitor 157 to the plate 146 of the triode 143, and the plate 150 of the triode 147 being connected through a resistor 158 to the circuit point 155. The plate 146 of the triode 143 may be further connected through a resistor 159 to the output of the 60 cycle pulse amplifier 45.

To illustrate the operation of this circuit, it may be assumed that the triode 143 is in a non-conducting state while the triode 147 is conducting with the capacitor 153 discharging so as to gradually increase the potential of the grid 145 and with the capacitor 157 charging so as to decrease the potential of the grid 149. The polarity of the pulses from the 60 cycle pulse amplifier 45 is negative and when a pulse is applied through the resistor 159, the grid 149 will be swung negative through the capacitor 157 to cause the triode 147 to be cut off. This will cause an immediate rise in the potential of the plate 150 and a corresponding rise in the potential of the grid 145 through the capacitor 153 so that the triode 143 will conduct. When the triode 143 conducts, the potential of the plate 146 will drop so as to lower the potential of the grid 149 to maintain the triode 147 in a non-conducting state. The capacitor 157 may then gradually discharge to raise the potential of the grid 149 and after a certain time interval dependent upon the time constants of the circuit including the resistor 154, the capacitor 157, the resistor 155, and the potentiometer 156, and dependent upon the operating potentials of the circuit, the potential of the grid 149 will be raised to an extent sufficient to cause conduction of the triode 147. This will cause an immediate drop in the potential of the plate 150 and a corresponding drop in the potential of the grid 145 to cause the triode 143 to cut-off. The circuit will then be in its originally assumed condition and when another pulse is applied from the pulse amplifier 45, this operation will be repeated.

It will be observed that when a pulse is received from the pulse amplifier, the tube 143 will conduct for a certain time interval and thus there will be positive pulse of voltage at the cathode 144 for such certain time interval. This time interval may be slightly longer than the duration of the vertical synchronizing signals and corresponds to the vertical blanking pulses 25 and 26 illustrated in Figure 3.

The positive vertical blanking pulses at the cathode 144 of the triode 143 are combined with the positive horizontal blanking pulses at the cathode 121 of the triode 120 of the horizontal blanking multi-vibrator 143. For this purpose, the cathode 144 is connected directly to a circuit point 160 and the cathode 121 is connected through a resistor 161 to such circuit point 160. The circuit point 160 is connected through a resistor 162 and a capacitor 163 in parallel with the resistor 162 and through a series capacitor 164 and through a series resistor 165 to the control grid 166 of a triode 167 forming the blanking pulse amplifier, the triode 167 also having a cathode 168 and a plate 169. The junction point between the resistor 62 and the capacitor 164 may be connected to a clipping rectifier 47 which limits the amplitude of the pulses to a certain value as determined by the bias level of the rectifier 47 which may, for example, be plus 7 volts. Such pulses are, of course, applied to the grid 166 through the capacitor 164 and resistor 165. To provide a return from the grid 166 to the cathode 168, a resistor 170 may be connected between the cathode 168 and the junction between capacitor 164 and resistor 165.

The blanking pulses at the jack 49 should be of a negative polarity, preferably with respect to ground. For this reason, the cathode 168 may be connected to a point of relatively high negative potential with respect to ground, for example minus 108 volts, and the plate 169 may be connected through a resistor 171 to ground, the jack 49 being connected directly to the plate 169.

With this circuit, an output is obtained at the jack 49 which may have a wave form such as designated by reference numeral 23 in Figure 3.

Referring now to Figure 2B, the circuits and general operation of the horizontal synchronizing gate 53, the equalizing pulse gate 54 and vertical synchronizing gate 55 may be similar to the buffer amplifier 36 or horizontal blanking gate 42 and the circuits and general operation of the horizontal synchronizing multi-vibrator 56, the equalizing pulse multi-vibrator 57 and the vertical synchronizing multi-vibrator 58 may be similar to the horizontal drive multi-vibrator 37 or horizontal blanking multi-vibrator 43. In particular, the horizontal synchronizing gate 53 may comprise a triode 172 having a plate 173, a cathode 174 connected through a resistor 175 to ground and a grid 176 connected through a conductor 177 to a circuit point 178 (Figure 2A) which is connected through a resistor 179 to the cap 50 on the delay line 33 and through a resistor 180 to the circuit point 137.

The horizontal synchronizing multi-vibrator 56 comprises a first triode 181 having a cathode 182 connected to ground, a grid 183 and a plate 184, and a second triode 185 having a cathode 184, and a second triode 185 having a cathode 186, a grid 187 and a plate 188. The plates 184 and 188 are respectively connected through resistors 189 and 190 to a circuit point 191 arranged to be connected to a point of relatively high positive potential, for example, plus 258 volts, relative to ground. The plates 184 and 188 are also respectively connected through capacitors 192 and 193 to the grids 187 and 183, the plate 188 being also connected directly to the plate 173 of the gate triode 172. The grid 183 is connected through a resistor 194 to a bias point 195 which is connected through a capacitor 196 to ground and which is also connected to the movable contact of a potentiometer 197 having one terminal connected to a point at a fixed potential relative to ground, for example plus 7 volts, with its other terminal connected to the bias inter-connect line 86 which as above indicated may be at a potential of roughly plus 65 volts relative to ground. The grid 187 is connected through a resistor 198 to ground.

In the operation of these horizontal synchronizing pulse circuits, positive pulses from the tap 50 on the delay line 33 are combined with positive pulses from the plate 76 of triode 75 of the horizontal drive multi-vibrator to obtain a signal having the same general form as the wave form 141 in Figure 3, with alternate pulses from the tap 50 of the delay line 33 being superposed on the pulses from the horizontal drive multi-vibrator 37. The bias level of the circuit is such that only such of the pulses as are superimposed on the pulses from the horizontal drive multi-vibrator are sufficient to trigger the multi-vibrator 56. The potentiometer 197 may be adjusted so that the duration of the pulse output of the multi-vibrator 56 will be the desired duration of the horizontal synchronizing pulses. This output is taken at the cathode 186 of the triode 185 in a manner as will be described.

The equalizing pulse gate 54 may comprise a triode 199 having a plate 200, a cathode 201 connected through a resistor 202 to ground, and a grid 203 connected through a conductor 204 to the tap 51 on the delay line 33. The equalizing pulse multi-vibrator 57 may comprise a first triode 205 having a cathode 206 connected to ground, a grid 207 having a plate 208, and a second triode 209 having a cathode 210, a grid 211 and a plate 212. The plates 208 and 212 are respectively connected through resistors 213 and 214 to a circuit point 215 arranged to be connected to a point of relatively high positive potential, for example plus 258 volts, relative to ground and the plates 208 and 212 are also respectively connected through capacitors 216 and 217 to the grids 211 and 207. The grid 207 is connected through a resistor 218 to a circuit point 219 which is connected through a capacitor 220 to ground and also connected to the movable contact of a potentiometer 221 having one terminal connected to a point having a certain potential relative to ground, for example plus 7 volts, with its other terminal connected to the bias inter-connect line 86. The grid 211 is connected through a resistor 222 to ground.

In the operation of this circuit, the equalizing pulse gate triode 199 is operative at certain times to transmit pulses from the tap 51 to the multi-vibrator 57. Each of such pulses will trigger the multi-vibrator to cause it to generate a pulse of a predetermined duration which may be adjusted by adjustment of the potentiometer 221. Such pulses appear at the cathode 210 of the triode 209 and are coupled to the composite synchronizing pulse amplifier 59 in the manner as will be described.

The vertical synchronizing gate 55 may comprise a triode 23 having a plate 224, a cathode 225 connected through a resistor 226 to ground and a grid 227 connected through a conductor 228 to the tap 52 on the delay line 33. The vertical synchronizing multi-vibrator 58 may comprise a first triode 229 having a cathode 230 connected to ground, a grid 231 and a plate 232, and a second triode 233 having a cathode 234, a grid 235 and a plate 236. The plates 232 and 236 are respectively connected through resistors 237 and 238 to a circuit point 239 which may be at plus 258 volts relative to ground, and the plates 232 and 233 may also be connected respectively through capacitors 240 and 241 to the grids 235 and 231. The grid 231 is connected through a resistor 242 to a movable contact of a potentiometer 243 having one terminal connected to a point of a certain potential relative to ground, for example plus 7 volts, with its other terminal connected to the bias inter-connect line 86. The grid 235 may be connected through a resistor 244 to ground.

In the operation of these vertical synchronizing pulse circuits, the vertical synchronizing gate triode 223 is operative at certain times to transmit pulses from the tap 52 on the delay line 33 to the multi-vibrator 58 which functions in the same general manner as the horizontal drive multi-vibrator 37 described in detail above and generates a pulse of predetermined duration when triggered by the pulses transmitted by the vertical synchronizing gate 55. Such pulses are of positive polarity and appear at the cathode 234.

It is a feature of the present invention that the pulse outputs of the multi-vibrators appear at the cathodes in that when the discharge device is non-conducting, the cathode will be at the potential of the power supply point to which it is connected, in this case ground. This provides a fixed reference for the positive pulses at the cathodes when the discharge device conducts.

According to a further feature of the invention, the fact that the pulses produced at the cathodes may have a fixed reference is utilized to obtain a direct combination of the horizontal synchronizing pulses, the equalizing pulses and the vertical synchronizing pulses, without requiring any buffer stages or the like. In particular, the cathodes 186, 210 and 234 in the horizontal synchronizing multivibrator 56, the equalizing pulse multi-vibrator 57 and the vertical synchronizing multi-vibrator 58 are connected together and through a common resistor 245 to ground. It will be appreciated that the wave form of the voltage across the resistor 245 will be of the same general form as the wave form 10 in Figure 3, except that the pulses will be of positive polarity rather than negative polarity and except that without very precise adjustment of the multivibrator circuits, the pulses of the three multi-vibrators may not all be of the same amplitude. Further, the pulses may not have a flat-topped form. To obtain uniform amplitude of the pulses, and the ordinarily desirable flat-topped form, the cathodes 186, 210 and 234 are connected through a resistor 246 and a capacitor 247 in parallel therewith to a circuit point 248 which is connected to the clipping rectifier 67 biased at a certain potential relative to ground, for example plus 7 volts. It will be appreciated that the positive pulses appearing at the point 248 will be of uniform amplitude and will have a flat-topped form.

The circuit point 248 is connected through a capacitor 249 and a series resistor 250 to the grid 251 of a triode 252 having a cathode 253 connected to a source of relatively high negative potential with respect to ground, for example minus 108 volts, and a plate 254 connected through a resistor 255 to ground and also directly to the jack 60. A return between the grid 251 and the cathode 253 is provided by means of a resistor 256 connected between the cathode 253 and the junction between the capacitor 249 and the resistor 250. It will be appreciated that with this circuit, negative pulses of uniform amplitude will appear at the jack 60, the wave form at this point being like that designated by reference numeral 10 in Figure 3.

As described above, the gate circuits 53, 54 and 55 are controlled from the 9 line multi-vibrator 61 and the 3 line gate multi-vibrator 64 in a manner as to cause generation of the horizontal synchronizing pulses, the equalizing pulses and the vertical synchronizing pulses in the proper sequence, the 3 line gate multi-vibrator being controlled by the 3 line delay multi-vibrator 65. These circuits will now be described in detail.

The 9 line multi-vibrator 61 may comprise a first triode 257 having a cathode 258, a grid 259 and a plate 260, and a second triode 261 having a cathode 262, a grid 263 and a plate 264. The plates 260 and 264 may be connected through resistors 265 and 266 to a point 267 at a relatively high positive potential, for example plus 258 volts, with respect to ground. The plates 260 and 264 may also be connected respectively through capacitors 268 and 269 to the grids 263 and 259. The grid 259 may be connected through a resistor 270 to ground and the grid 263 may be connected through a capacitor 271 to ground and also through a resistor 272 to the movable contact of a potentiometer 273 having one terminal connected to a point at a certain potential relative to ground, for example plus 150 volts, with its other terminal connected to the bias inter-connect line 86. The plate 260 may also be connected through a resistor 274 to the output of the 60 cycle pulse amplifier 45.

The cathode 258 of the triode 257 may be connected directly to the cathode 174 of the horizontal synchronizing gate triode 172 and the cathode 262 may be connected directly to the cathode 201 of the equalizing pulse gate triode 199.

To illustrate the operation of the 9 line multivibrator 61, it may be assumed that the triode 257 is in a non-conducting state with the triode 261 conducting. Under such conditions, the 9 line multi-vibrator 61 will have no effect on the horizontal synchronizing gate circuit 53 and the gate 53 may function to transmit pulses from the tap 50 in conjunction with pulses from the horizontal drive multi-vibrator 37 to the horizontal synchronizing multi-vibrator 56. Conduction through the triode 261 will cause appreciable current flow to the resistor 202 in the cathode circuit of the equalizing pulse gate triode 199 to bias the triode 199 so that pulses will not be coupled from the tap 51 to the equalizing pulse multi-vibrator 57.

When a pulse from the 60 cycle pulse amplifier 45 is applied through the resistor 274 and capacitor 268 to the grid 263 of the triode 261, the triode 261 may be cut off to cause the potential of the plate 264 thereof to rise and thus raise the potential of the grid 259 of the triode 257 and cause the triode 257 to conduct. The triode 257 will be in a conducting state and the triode 261 in a non-conducting state for a certain time interval dependent upon the time constants and operating potentials of the circuits. This time interval may be equal to 9 times the period of the horizontal synchronizing pulses, or 9 horizontal lines. During this time interval, conduction of the triode 257 will cause a substantial current through the resistor 175 in the cathode circuit of the horizontal synchronizing pulse gate triode 172, which will elevate the potential of the cathode 174 and prevent transmission of pulses from the delay line to the horizontal synchronizing pulse multi-vibrator 56.

During this 9 line time interval, the triode 261 is in a non-conducting state so that there will be reduced current flow through the resistor 202 and the cathode circuit of the equalizing pulse gate tube 199. Thus for this 9 line interval, pulses may be transmitted from the tap 51 on the delay line 33 to the equalizing pulse multi-vibrator 57. However, as will be pointed out, during the intermediate portion of this 9 line time interval, the 3 line gate multivibrator 64 will prevent transmission of such pulses so that the equalizing pulses will be transmitted to the equalizing pulse multi-vibrator 57 during a first portion and a last portion of the 9 line time interval.

The 3 line gate multi-vibrator 64 may comprise a first triode 275 having a cathode 276, a grid 277 and a plate 278 and a second triode 279 having a cathode 280, a grid 281 and a plate 282. The plates 278 and 282 are respectively connected through resistors 283 and 284 to the circuit point 239 and are also connected through resistors 285 and 286 to the grids 277 and 281, the grid 277 being connected through resistor 287 to ground and the grid 281 being connected through a resistor 288 to the movable contact of a potentiometer 289 having one terminal connected to a point of fixed potential relative to ground, for example plus 150 volts, with another terminal connected to the bias inter-connect line 86. The cathode 276 is connected to the cathode 201 of the equalizing pulse gate triode 199 and the cathode 280 is connected to the cathode 225 of the vertical synchronizing pulse gate triode 223.

In the operation of the 3 line gate multi-vibrator 64, it may be assumed that the triode 275 is in a non-conducting state with the triode 279 in a conducting state. With the triode 275 in a non-conducting state, it will have no effect on the operation of the equalizing pulse gate circuit 54. Conduction of the triode 279 will cause substantial current flow through the resistor 226 in the cathode circuit of the vertical pulse gate triode 223 which will so bias the triode 223 as to prevent coupling of triggering pulses from the delay line 33 to the vertical synchronizing pulse multi-vibrator 58.

In a manner that will be described, the 3 line gate multi-vibrator 64 is triggered after the elapse of a certain time interval following the start of the heretofore described 9 line interval. This triggering will cause the triode 275 to conduct and the triode 279 to not conduct for a certain time interval, which may be of 3 line duration. When the triode 275 conducts, it will cause a substantial flow through the resistor 202 in the cathode circuit of the equalizing pulse gate triode 199 to so bias that triode as to prevent transmission of triggering pulses from the delay line 33 to the equalizing pulse multi-vibrator 57. When the triode 279 is non-conducting, the current through the resistor 226 in the cathode circuit of the vertical synchronizing pulse gate triode 223 will be reduced to allow that triode to transmit triggering pulses from the delay line 33 to the vertical synchronizing pulse multi-vibrator 58. Thus during an intermediate portion of the 9 line time interval, the equalizing pulse multi-vibrator 57 will not function and the vertical synchronizing pulse multi-vibrator 58 will function.

The triggering of the 3 line gate multi-vibrator 64 is controlled by the 3 line delay multi-vibrator 65. The multi-vibrator 65 may comprise a first triode 290 having a cathode 291 connected to ground, a grid 292 and a plate 293 and a second triode 294 having a cathode 295, a grid 296 and a plate 297. The plates 293 and 297 may be connected through resistors 298 and 299 to the circuit point 239 and respectively through capacitors 300 and 301 to the grids 296 and 292, the grid 292 being connected through a resistor 302 to ground and the grid 296 being connected through a resistor 303 to the movable contact of a potentiometer 304 having one terminal connected to a point at a fixed potential with respect to ground, for example plus 150 volts, with the other terminal thereof being connected to the bias interconnect line 86 which might be at a potential of roughly 65 volts with respect to ground. The grid 296 may be coupled through the capacitor 300 and through a resistor 305 to the output of the 60 cycle pulse amplifier 45 and the plate 297 of the triode 294 may be coupled through a resistor 306 and a triode or rectifier 307 and the capacitor 385 to the grid 281 of the triode 279 of the 3 line gate multi-vibrator 64.

In operation, the triode 294 may be conducting with the triode 290 non-conducting. When the pulse of negative polarity from the 60 cycle pulse amplifier 45 is applied through the resistor 305 and capacitor 300 to the grid 296 of the triode 294, the triode 294 will be cut off to allow the potential of the plate 297 to rise to the potential of the point 239 and to raise the potential of the grid 292 of the triode 290 to cause it to conduct. This operation will have no effect on the 3 line gate multivibrator 64 because of the polarity of the rectifier 307. After a certain time interval, determined by the time constant and operating potentials of the circuit, the triode 294 will again conduct to lower the potential of the plate 297 thereof and lower the potential of the grid 292 to cut off the triode 290. This will raise the potential of the plate 293 toward the potential of the circuit point 239 which through the capacitor 300 will raise the potential of the grid 296 to a point where the grid may be positive with respect to the cathode 295 to cause a large current flow through the triode 294. This large current flow will lower the potential of the plate 297 to a relatively low value for a short pulse-like time interval. This lowered potential of the point 297 will be transmitted through the resistor 306 and rectifier 307 and capacitor 285 to the grid 281 of the triode 279 to cut off the triode 279 and cause operation of the 3 line gate multi-vibrator 64 in a manner as above described.

As previously indicated, an output of the 9 line multivibrator 61 is utilized to generate the vertical drive pulses through the amplifier 62. This output of the multi-bibrator 61 may be taken at the point 264 of the triode 261 and which positive voltage pulses of 9 horizontal line duration appear at the vertical repetition rate of 60 per second. The point 264 is coupled through a capacitor 308 and through a series resistor 309 to the grid 310 of a triode 311 having a cathode connected to a point of relatively high negative potential, for example minus 108 volts, relative to ground and also through a resistor 313 to the junction between capacitor 308 and resistor 309, the triode 311 also having a plate 314 connected through a resistor 315 to ground and to the jack 63. It will be appreciated that with this circuit pulses of negative polarity will appear at the jack 63 at the vertical repetition rate of 60 per second, each pulse having a duration of 9 lines.

It will be readily appreciated from the foregoing that the synchronizing generator of this invention utilizes a minimum number of component parts to produce the complex pulse outputs required of a television synchronizing generator. At the same time, the required outputs are very accurately produced with minimum interaction between the various pulsing circuits. Further, the circuits are very stable and reliable in operation, and are readily adjusted. Of particular importance is the fact that only one delay line is required; the gating of the horizontal blanking and horizontal synchronizing pulse circuits from the horizontal drive multi-vibrator to insure proper and stable operation of such circuits; the gating of the pulses applied to the horizontal synchronizing, equalizing and vertical synchronizing multi-vibrators to obtain the required pulses directly at the outputs of such multi-vibrators without requiring modulator circuits at the outputs of such multi-vibrators; and the use of cathode coupling in the gating circuits; and in the direct combination of the pulse outputs of the multi-vibrators. It is again noted that by the coupling of cathodes of the multi-vibrators, a direct combination of the pulse outputs of the multi-vibrators may be made since when the conduction devices of the multi-vibrators are not conducting, the cathodes will be at the fixed potential. At the same time, no undesirable inter-action between multi-vibrators arises because the triggering of the multi-vibrators is determined primarily by the action of the grid and plate circuits thereof and not of the potential of the cathode of the non-conducting discharge device of the multi-vibrators.

It will be appreciated that although the disclosed embodiment of pulse generator utilizes discharge devices of a triode vacuum type, other types of discharge devices may be used and the term "discharge device" is intended to include gaseous as well as vacuum devices, transistors and equivalents, and the terms "cathode," "grid" and "anode or plate" are likewise used in a sense to include equivalent elements. It will also be appreciated that multi-grid devices or the like having elements in addition to a cathode, a grid and an anode may be used without changing the basic operation of the circuits. The recitation of a discharge device having a cathode, a grid and an anode is therefore intended to include devices having additional elements.

Two or more discharge devices may, of course, be incorporated in a common casing or envelope. In an actual generator constructed according to this invention, a total of only 22 miniature tubes having two triode sections in a single envelope are used, including the tubes of the oscillator, frequency dividers, and the 60 cycle pulse amplifier.

It will be further appreciated that the generator as described is designed to generate wave forms of a type necessitated by present F.C.C. regulations and that if such regulations are varied, the design of the generator of this invention may be varied accordingly. Descriptions of the particular wave forms generated by the illustrated generator are therefore intended to include equivalent wave forms.

It will be further understood that modifications and variations may be effected without departing from the spirit and scope of the novel concepts of the present invention.

I claim as my invention:

1. In a television synchronizing pulse generator for generating horizontal synchronizing pulses, vertical synchronizing pulses at a repetition rate equal to an integer multiple of the repetition rate of the horizontal synchronizing pulses, and horizontal camera drive pulses at the repetition rate of the horizontal synchronizing pulses, an oscillator for generating a signal at a frequency equal to the repetition rate of the vertical synchronizing pulses, a delay line coupled to said oscillator, first means triggered from a signal from said delay line for generating the horizontal camera drive pulses, second means triggered by a signal from said delay line for generating the horizontal synchronizing pulses, third means triggered by a signal from said delay line for generating said vertical synchronizing pulses, and means coupled to said first means for controlling the application of the signal from said delay line to said second means.

2. In a television synchronizing pulse generator for generating a composite synchronizing signal including horizontal synchronizing pulses, trains of vertical synchronizing pulses, a series of equalizing pulses before each train of vertical synchronizing pulses, a blanking signal including horizontal and vertical pulses, and horizontal and vertical camera drive pulses, the repetition rate of the vertical synchronizing and equalizing pulses being equal to an odd multiple of the repetition rate of the trains of vertical synchronizing pulses and the vertical blanking and camera drive pulses with the repetition rate of the horizontal synchronizing, blanking and camera drive pulses being equal to one-half of the repetition rate of the vertical synchronizing and equalizing pulses, an oscillator for generating pulses at the repetition rate of the vertical synchronizing and equalizing pulses, a delay line coupled to said oscillator, first means coupled to said oscillator and triggered by alternate pulses for generating the horizontal camera drive pulses, second means coupled to said delay line and triggered by alternate pulses for generating the horizontal blanking pulses, third means coupled to said delay line and triggered by alternate pulses for generating the horizontal synchronizing pulses, means coupled to said delay line for generating the vertical synchronizing and equalizing pulses, and means coupling said second and third means to said first means to synchronize the triggering of said second and third means with the triggering of said first means.

3. In a pulse generator, oscillator means for generating pulses at a predetermined repetition rate, first and second multi-vibrators each triggered by pulses from said oscillator for generating pulses at a second predetermined rate equal to said predetermined rate divided by an integer number, delay means for delaying the pulses applied to said second multi-vibrator from the pulses applied to said first multi-vibrator, and synchronizing means coupling said second multi-vibrator to said first multi-vibrator.

4. In a pulse generator, oscillator means for generating pulses at a first predetermined repetition rate, first and second multi-vibrators each triggered by pulses from said oscillator for generating pulses at a second predetermined repetition rate equal to said first predetermined repetition rate divided by an integer number, delay means for delaying the pulses applied to said second multi-vibrator from the pulses applied to said first multi-vibrator, a gate circuit for controlling the application of pulses to said second multi-vibrator, and means coupling pulses from said first multi-vibrator to said gate circuit to control application of triggering pulses to said second multi-vibrator and synchronize the operation of said multi-vibrators.

5. In a pulse generator, oscillator means for generating pulses at a first predetermined repetition rate, first and second multi-vibrators each triggered by pulses from said oscillator for generating pulses at a second predetermined repetition rate equal to said first predetermined repetition rate divided by an integer number, delay means for delaying the pulses applied to said second multi-vibrator from the pulses applied to said first multi-vibrator, a gate circuit for controlling the application of pulses to said second multi-vibrator, and means coupling pulses from said first multi-vibrator to said gate circuit to control application of triggering pulses to said second multi-vibrator and synchronize the operation of said multi-vibrators, the duration of the pulses coupled from said first multi-vibrator to said gate circuit being greater than the delay of the triggering pulses applied to said second multi-vibrator from the triggering pulses applied to said first multi-vibrator.

6. In a pulse generator, oscillator means for generating pulses at a first predetermined repetition rate, first and second multi-vibrators each triggered by pulses from said oscillator for generating pulses at a second predetermined repetition rate equal to said first predetermined repetition rate divided by an integer number, delay means for delaying the pulses applied to said first multi-vibrator, said first multi-vibrator comprising first and second alternately conducting discharge devices, said first device being changed from a conducting state to a non-conducting state for a certain time interval upon triggering of said first multi-vibrator, an impedance in series with said first device and connected at one end to a point at a fixed potential, a gate circuit including a third discharge device for coupling triggering pulses to said second multi-vibrator, and means coupling the other end of said impedance to said gate circuit to bias said third discharge device beyond cut-off when said first device is conducting.

7. In a pulse generator, oscillator means for generating pulses at a first predetermined repetition rate, first and second multi-vibrators each triggered by pulses from said oscillators for generating pulses at a second predetermined repetition rate equal to said first predetermined repetition rate divided by an integer number, delay means for delaying the pulses applied to said first multi-vibrator, said first multi-vibrator comprising first and second alternately conducting discharge devices, said first device being changed from a conducting state to a non-conducting state for a certain time interval upon triggering of the first multi-vibrator, an impedance in series with said first device and connected at one end to a point at a fixed potential, a gate circuit including a third discharge device for coupling triggering pulses to said second multi-vibrator, and means coupling the other end of said impedance to said gate circuit to bias said third discharge device beyond cut-off when said first device is conducting, said certain time interval being at least as great as the delay of triggering pulses applied to said second multi-vibrator from the triggering pulses applied to said first multi-vibrator.

8. In a television synchronizing pulse generator for generating a composite synchronizing signal including horizontal pulses and trains of vertical pulses, a first multi-vibrator for generating the horizontal pulses, a second multi-vibrator for generating the vertical pulses, a normally operative gate circuit for applying triggering pulses to said first multi-vibrator, a normally inoperative gate circuit for applying triggering pulses to said second multi-vibrator, means for periodically rendering said normally operative gate circuit inoperative and said normally inoperative gate circuit operative for a certain time interval, and means for directly combining the outputs of said multi-vibrators.

9. In a pulse generator, first and second multi-vibrators each including a discharge device rendered conductive at certain times for certain time intervals, a circuit point arranged for connection to a power supply, an impedance in series with each of said discharge devices and connected at one end to said circuit point, and output coupling means connected between said circuit point and the other end of said impedance.

10. In a pulse generator, first and second multi-vibrators each including a pair of discharge devices each having a cathode, a grid and an anode and means including cross-connections between the grids and anodes for rendering the devices of each pair alternatively conductive, an impedance having one end arranged for connection to a power supply terminal, means connecting the other end of said impedance to the cathode of one device of said first multi-vibrator and to the cathode of one device of said second multi-vibrator, and output coupling means connected to ends of said impedance.

11. In a pulse generator, a gate circuit including a first discharge device having a cathode, a grid and an anode, input means coupled to said grid, output means coupled to said anode, a multi-vibrator including second and third discharge devices each having a cathode, a grid and an anode and means including cross-connections between the grids and anodes for rendering said second and third devices alternatively conductive, an impedance having one end arranged for connection to a power supply point, and means connecting the other end of said impedance to the cathodes of said first and second devices to increase the bias of said first device when said second device is conductive.

12. In a television synchronizing pulse generator for generating horizontal and vertical synchronizing signals and horizontal and vertical camera drive pulses, means for developing triggering pulses at the repetition rate of said vertical synchronizing signals and camera drive pulses, a multi-vibrator triggered by said pulses for controlling generation of said vertical and horizontal synchronizing signals, and amplifier means coupled to an output of said multi-vibrator for generating the vertical camera drive pulses.

13. In a television synchronizing pulse generator for generating horizontal synchronizing pulses, and vertical synchronizing signals each including a train of vertical synchronizing pulses and a series of equalizing pulses before and after the train of vertical synchronizing pulses, a first multi-vibrator for generating the horizontal pulses, a second multi-vibrator for generating the equalizing pulses, a third multi-vibrator for generating the vertical pulses, a fourth multi-vibrator operative at the repetition rate of the vertical signals to generate first controls pulses having durations equal to the duration of the vertical synchronizing signals, a fifth multi-vibrator operative at the repetition rate of the vertical synchronizing signals to generate second control pulses having durations equal to the durations of the trains of vertical synchronizing pulses, means for delaying the start of said second control pulses from the start of said first control pulses by a time period equal to the duration of the series of equalizing pulses preceding each train of vertical synchronizing pulses, a normally operative gate circuit for coupling triggering pulses to said first multi-vibrator and coupled to said fourth multi-vibrator to be rendered inoperative for the duration of said first control pulses, a normally inoperative gate circuit for coupling triggering pulses to said second multi-vibrator and coupled to said fourth and fifth multi-vibrators to be rendered operative by said first control pulses except for being rendered inoperative during said second control pulses, and a normally inoperative gate circuit for coupling triggering pulses to said third multi-vibrator and coupled to said fifth multi-vibrator to be rendered operative during said second control pulses.

14. In a pulse generator, a multi-vibrator comprising first and second discharge devices each having a grid, an anode and a cathode, positive and negative circuit points arranged for connection to a power supply, a pair of impedances connecting said anodes to said positive circuit point, means connecting said grids and cathodes to said negative circuit points including impedances between the grids and said negative circuit point, a capacitor between each grid and the anode of the other device, a gate circuit including a third discharge device having a grid, an anode directly connected to the anode of one of said first and second devices and a cathode connected to said negative circuit point, means for applying the triggering signal to said grid of said third device, and means coupled to said cathode of said third device for controlling the grid-cathode bias thereof to control coupling of said triggering signal to said multi-vibrator.

15. In a pulse generator, a first multi-vibrator comprising first and second discharge devices each having a grid, an anode and a cathode, positive and negative circuit points arranged for connection to a power supply, a pair of impedances connecting said anodes to said positive circuit point, means connecting said grids and cathodes to said negative circuit point including impedances between said grids and said negative circuit point, a capacitor between each grid and the anode of the other device, means for applying first triggering pulses to said first multi-vibrator to control triggering thereof at a repetition rate equal to the repetition rate of said first triggering pulses divided by an integer number, a second multi-vibrator, a gate circuit comprising a third discharge device having a cathode, a grid and an anode, means coupling said anode of said third device to said second multi-vibrator and to said positive circuit point, means coupling said cathode to said negative circuit point, means for applying second triggering pulses of positive polarity to said grid of said third device at the repetition rate of said first triggering pulses but delayed with respect thereto, and means coupling the anode of said first device to said grid of said third device to bias said third device beyond cut-off when said first device is conducting and to provide a fixed bias level for said third device when said first device is non-conducting.

16. In a television synchronizing pulse generator for generating the composite synchronizing signal including horizontal synchronizing pulses and trains of vertical synchronizing pulses, a pulse generator, a first monostable multi-vibrator triggered by pulses from said pulse generator for generating a vertical synchronizing pulse of predetermined duration in response to each pulse received from said pulse generator, a second monostable multi-vibrator triggered by pulses from said pulse generator for generating a horizontal pulse of predetermined duration in response to each pulse received from said pulse generator, means including gate circuits for controlling transmission of pulses from said pulse generator to said multi-vibrators, and means for combining the outputs of said multi-vibrators to produce a composite synchronizing signal.

17. In a television synchronizing pulse generator for generating trains of vertical synchronizing pulses, a series of equalizing pulses before each train of vertical synchronizing pulses with the repetition rate of the vertical synchronizing and equalizing pulses being equal to an odd multiple of the repetition rate of the trains of vertical pulses, and horizontal synchronizing pulses at a repetition rate equal to one-half the repetition rate of the vertical synchronizing and equalizing pulses, an oscillator for generating pulses at the repetition rate of the vertical synchronizing and equalizing pulses, monostable multivibrator means for generating a composite synchronizing signal, comprising at least one normally conductive control device and a normally non-conductive control device associated with each normally conductive control device, and timing circuit elements inter-connecting said devices and operative in response to a triggering signal to render said normally conductive device non-conducting and said normally non-conductive device conducting for a certain time interval to develop an output pulse of a certain duration, gate means for applying triggering pulses from said oscillator to said monostable multivibrator means, said gate means being operative during certain time intervals to initiate operation of said monostable multivibrator means in response to each pulse from said oscillator and operative in other time intervals to initiate operation of said monostable multivibrator means in response to alternate pulses from said oscillator.

18. In a television synchronizing pulse generator for generating trains of vertical synchronizing pulses, a series of equalizing pulses before each train of vertical synchronizing pulses with the repetition rate of the vertical synchronizing and equalizing pulses being equal to an odd multiple of the repetition rate of the trains of vertical pulses, and horizontal synchronizing pulses at a repetition rate equal to one-half the repetition rate of the vertical synchronizing and equalizing pulses, an oscillator for generating pulses at the repetition rate of the vertical synchronizing and equalizing pulses, monostable multivibrator means for generating a composite synchronizing signal, gate means for applying triggering signals from said oscillator to said monostable multivibrator means, said gate means being operative during certain time intervals to initiate operation of said monostable multivibrator means in response to each pulse from said oscillator and being operative in other time intervals to initiate operation of said multivibrator means in response to alternate pulses from said oscillator, and means including selectively operative separate timing circuit elements associated with said monostable multivibrator means for causing generation of pulses of certain durations during the certain time intervals and pulses of other durations during said other time intervals.

References Cited in the file of this patent

UNITED STATES PATENTS

| | | |
|---|---|---|
| 2,145,332 | Bedford | Jan. 31, 1939 |
| 2,444,036 | Crost | June 29, 1948 |
| 2,462,111 | Levy | Feb. 22, 1949 |
| 2,515,613 | Schoenfeld | July 18, 1950 |
| 2,516,888 | Levy | Aug. 1, 1950 |
| 2,527,769 | Sinsheimer | Oct. 31, 1950 |
| 2,533,821 | Langer | Dec. 12, 1950 |
| 2,545,082 | Grosdoff | Mar. 13, 1951 |
| 2,568,644 | Larsen et al. | Sept. 18, 1951 |
| 2,577,141 | Mauchly et al. | Dec. 4, 1951 |
| 2,594,731 | Connolly | Apr. 29, 1952 |
| 2,619,548 | Lesti | Nov. 25, 1952 |
| 2,634,052 | Bloch | Apr. 7, 1953 |
| 2,666,675 | Edwards | Jan. 19, 1954 |
| 2,749,437 | Parr | June 5, 1956 |
| 2,766,379 | Pugsley | Oct. 9, 1956 |